June 11, 1929.  W. E. WARNER  1,716,397
DISCHARGE VALVE
Original Filed May 28, 1927
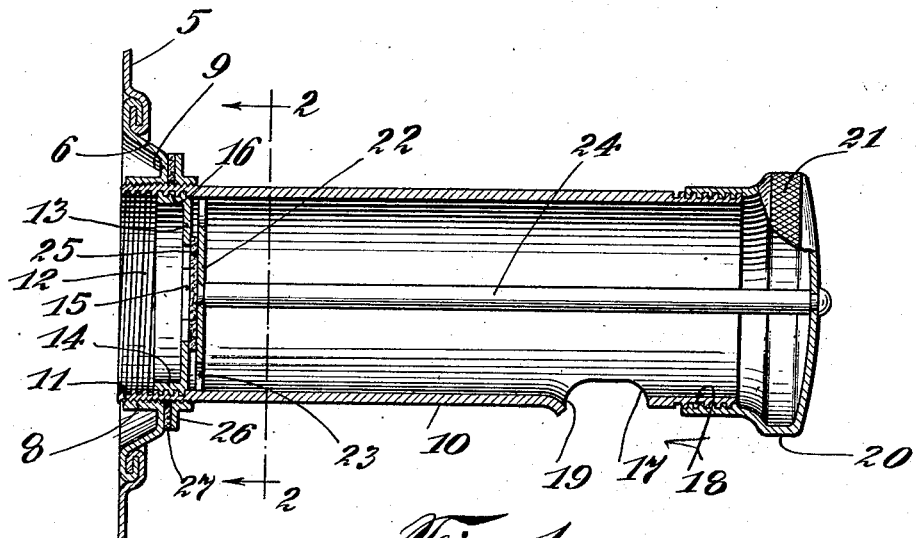
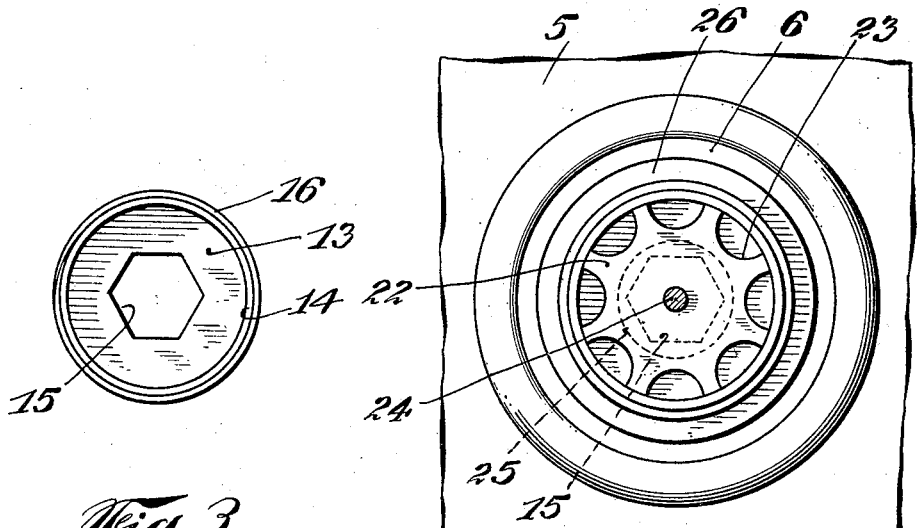
INVENTOR
William E. Warner
BY
his ATTORNEY Patented June 11, 1929.

1,716,397

UNITED STATES PATENT OFFICE.

WILLIAM E. WARNER, OF RAHWAY, NEW JERSEY, ASSIGNOR TO WARNER BROS. INC., OF NEWARK, NEW JERSEY, A CORPORATION OF NEW JERSEY.

DISCHARGE VALVE.

Application filed May 28, 1927, Serial No. 194,925. Renewed November 15, 1928.

This invention relates to discharge valves for barrels, casks or other receptacles used as containers for liquid commodities, and has for its primary object to provide a simply constructed device of this character which may be readily screwed into the bung hole or opening in the head of the barrel or cask, one of the important features of the device residing in the provision of means for effecting a fluid tight joint between the valve casing and the bung hole bushing.

It is another object of the invention to provide a valve casing which may be inexpensively produced from sheet steel and provided in its wall adjacent one of its ends with a vent opening, together with a simple form of valve seat member threaded into the other end of the casing and valve means to cooperate therewith and effect a tight seal preventing passage of the fluid from the cask or container through the valve casing.

It is another object of the invention to provide a valve member of very simple form, together with a connecting rod between said member and a rotatable cap or head threaded on the outer end of the valve casing whereby the valve member may be readily adjusted to its open and closed positions.

With the above and other objects in view, the invention consists in the improved discharge valve, and in the form, construction and relative arrangement of its several parts as will be hereinafter more fully described, illustated in the accompanying drawings, and subsequently incorporated in the subjoined claims.

In the drawings, wherein I have shown one simple and practical embodiment of the invention, and in which similar reference characters designate corresponding parts throughout the several views,—

Figure 1 is a fragmentary section through one end or head of a sheet metal cask or barrel showing my improved valve applied thereto;

Fig. 2 is a sectional view taken on the line 2—2 of Fig. 1, and

Fig. 3 is a plan view of the valve seat member.

Referring in detail to the drawing, 5 designates one of the sheet metal heads of the cask or barrel having an opening formed therethrough to receive the sheet metal bushing generally indicated at 6 into which the bung or spud (not shown) is adapted to be threaded to tightly seal the opening through the bushing and prevent the escape of the contents of the barrel or cask during transportation.

The outer edge of the sheet metal bushing and the edge of the opening in the sheet metal head 5 are connected with each other by an interlocking seam formed under die pressure as shown at 7. The construction of this bushing and the manner of its connection with the head 5 is not herein claimed, since it forms the subject matter of my pending application Serial No. 153,979, filed December 10, 1926. For the purposes of this explanation, it will suffice to state that this bushing is provided with the inner internally threaded wall 8 to receive the bung or spud and with the annular part 9 surrounding this bushing wall and which is positioned outwardly of the seam 7.

The discharge valve constituting the subject matter of this application embodies the elongated cylindrical casing 10 which is produced from a single sheet of cold rolled steel, bent into cylindrical form and having its edges welded together.

This casing at one of its ends is provided with an external V-shaped thread 11 for engagement with the internal threads on the bushing wall 8, and also with an internal square thread 12 in which a valve seat member is adapted to be engaged. As herein shown, this seat member is in the form of a sheet metal die stamping. Thus, under the pressure of the dies, this circular piece of metal may be converted into the cup-shaped member 13 having an annular flange 14, and said member being centrally provided with a polygonal shaped opening 15 for the purpose of receiving a suitable wrench. The flange 14 is provided with an external square thread 16 for engagement with the internal threads 12 on the end of the casing 10.

In spaced relation to its other end, the wall of the casing 6 is provided with a suitably shaped vent opening 17 and beyond this vent opening with an external square thread 18. The edge of the vent opening at the inner side thereof is turned outwardly and downwardly to provide the curved lip 19. Upon the threaded end 18 of the casing the adjustable cap 20 is engaged, said cap having an external annular surface suitably knurled as indicated at 21.

The valve member which cooperates with the seat member 13 consists of a sheet metal disc 22 of slightly less diameter than the internal diameter of the casing 10 so as to move freely therein, and having its outer edge provided with a plurality of spaced recesses 23. This valve disc may be conveniently produced from the circular sheet of metal resulting from cutting the opening through the wall or head 5 of the cask. To this disc at its center one end of the rod 24 is rigidly fixed, the other end of said rod being centrally secured to the cap member 20.

Upon the face of the valve disc 22 opposed to the seat member 13, a sheet of leather or other suitable material 25 is adhesively secured. This leather sheet or washer is of sufficient diameter to engage upon the wall of the seat member 13 around the opening 15 therein and tightly seal said opening, but does not extend over the recesses 23 in the disc 22, as will be seen from reference to Fig. 2 of the drawing.

Upon the externally threaded end portion 11 of the valve casing, a flanged metal washer 26 is engaged, and a packing gasket of leather or other material indicated at 27 is engaged over the end of the casing against this washer plate.

In the use of my improved valve as above described, it will be understood that the bung or spud is first unthreaded and removed and the threaded end 11 of the valve casing is then threaded within the wall or sleeve 8 of the bushing until the packing gasket 27 is tightly compressed against the annular part 9 of said bushing whereby possible seepage of the liquid contents of the container between the threads of the wall 8 and the valve wall will be prevented. The valve being tightly closed and the leather disc 25 seated against the outer face of the member 13 around the opening 15 thereof, the barrel or cask is supported upon a rack or other suitable base in a horizontal position, and with the vent opening 17 located at the lower side of the valve casing. Thus, when it is desired to discharge or decant the contents of the cask, it is only necessary to rotate the cap 20 on the end of the valve casing in the proper direction to thus draw the valve disc 22 and the leather disc 25 away from the seat member 13. The liquid may then pass from the interior of the cask through the opening 15 and flow freely through the recesses 23 in the disc 22, such liquid flowing through the cylindrical valve casing and being directed by the downwardly turned lip 19 through the vent opening 17 into a suitable receptacle arranged beneath the same. It will be apparent that only a slight turning movement of the cap 20 is necessary in order to permit of the free flow of the liquid. After the desired quantity has been drawn from the cask, the cap 20 is turned in the reverse direction, thereby again tightly seating the leather disc 25 against the face of the seat member 13 around the opening 15 thereof and effectually cutting off the further flow of the liquid.

It will be apparent from the foregoing description that a decanting valve of this construction can be produced at a minimum manufacturing cost, all of the several parts thereof with the exception of the rod 24, being produced by simple die stamping operations. Frequently such metal casks or barrels have a very deep chime, which therefore, necessitates a valve casing of considerable length. However, by the provision of the rigid rod connection 24 between the valve member and the cap 20 on the end of the casing, I provide a very simple and inexpensive means whereby the valve can be easily and quickly adjusted. It will however, be understood that the specific form of this valve member, as well as the seat member 13 might be changed in various minor particulars, without materially affecting the results obtained in the operation of the device. Also, while for convenience, I have illustrated and described a particular construction of the sheet metal bushing with which the valve casing is adapted to be connected, it will be evident that this bushing and the manner of its attachment to the head or end wall of the sheet metal cask might be of various forms. Accordingly, it is to be understood that as to these and the other details of my present disclosure, I reserve the privilege of incorporating the same in various other alternative constructions, as may be fairly considered within the spirit and scope of the invention as claimed.

I claim:

1. A valve for tanks and the like comprising an elongated sheet metal cylindrical casing having internal and external threads at one of its ends and adapted for connection with the threaded wall of a bung hole bushing, an externally threaded valve seat member of stamped sheet metal adapted for engagement with the internal threads on said end of the casing, an internally threaded adjustable cap engaged upon the other end of said casing, the casing wall having an outlet opening adjacent to said cap, a valve to cooperate with the valve seat member, said valve including a metal disc having spaced recesses in its perimeter, a fiber disc secured upon one face of the metal disc to engage the valve seat member, and a rod rigidly connecting the metal valve disc with said cap to move the valve to its open and closed positions upon adjustment of the cap relative to the casing.

2. A valve for tanks and the like comprising an elongated casing externally and internally threaded at one of its ends and adapted for engagement in the bung hole bushing of the tank, an externally threaded valve seat member adapted to be engaged within said end of the casing, said valve seat member consisting of a cupped metal disc having an opening in its wall, a closure cap adjustable upon the other end of the casing, the wall of the casing adjacent its latter end being provided with an outlet opening for the liquid, a valve to cooperate with said valve seat member, and connecting means between said valve and the cap whereby the valve is adjustably positioned with respect to the valve seat member upon the adjustment of the cap relative to the casing.

3. A valve for tanks and the like comprising an elongated casing having internal and external threads at one of its ends and adapted for engagement in a bung hole bushing of the tank, a valve seat member threaded within said end of the casing and having a plate extending diametrically across the casing provided with a central opening, a closure cap adjustable upon the other end of the casing, the casing wall adjacent to its latter end having an outlet opening for the liquid, a valve disc having spaced recesses in its perimeter and provided with means to close the opening in the valve seat plate and spacing said disc therefrom, and means connecting the valve with said closure cap whereby said valve is adjusted with respect to the valve seat member upon the adjustment of said cap relative to the casing.

4. A valve for tanks and the like comprising an elongated casing externally threaded at one of its ends for engagement in the treaded bung hole bushing of the tank, a valve seat member within said end of the casing, a closure cap adjustable upon the other end of the casing, the wall of the casing adjacent its latter end and remote from the valve seat member being provided with an outlet opening for the liquid, a valve within the casing to cooperate with said valve seat member, and connecting means between said valve and the cap whereby the valve is adjustably positioned with respect to the valve seat member upon the adjustment of the closure cap relative to the casing.

In testimony that I claim the foregoing as my invention, I have signed my name hereto.

WILLIAM E. WARNER.